US008978473B2

(12) United States Patent
Le Traon et al.

(10) Patent No.: US 8,978,473 B2
(45) Date of Patent: Mar. 17, 2015

(54) ELECTRODES AND ASSOCIATED ELECTRONIC CIRCUITS FOR A PIEZOELECTRIC VIBRATING GYROMETER

(75) Inventors: Olivier Le Traon, Vauhallan (FR); Steve Masson, Le Plessis Robinson (FR); Jean Guerard, Juvisy (FR); Raphael Levy, Paris (FR); Claude Chartier, Massy (FR); Denis Janiaud, Les Ullis (FR)

(73) Assignee: Office National d'Etudes et de Recherches Aerospatiales (ONERA), Chatillon (FR)

( * ) Notice: Subject to any disclaimer, the term of this patent is extended or adjusted under 35 U.S.C. 154(b) by 304 days.

(21) Appl. No.: 13/518,148

(22) PCT Filed: Dec. 20, 2010

(86) PCT No.: PCT/FR2010/000854
§ 371 (c)(1),
(2), (4) Date: Jul. 24, 2012

(87) PCT Pub. No.: WO2011/086247
PCT Pub. Date: Jul. 21, 2011

(65) Prior Publication Data
US 2012/0279303 A1 Nov. 8, 2012

(30) Foreign Application Priority Data
Dec. 23, 2009 (FR) ..................................... 09 06327

(51) Int. Cl.
*G01C 19/56* (2012.01)
*G01C 19/5614* (2012.01)
*G01C 19/5607* (2012.01)

(52) U.S. Cl.
CPC ........ *G01C 19/5614* (2013.01); *G01C 19/5607* (2013.01)

USPC ....................................................... 73/504.16

(58) Field of Classification Search
CPC ........... G01C 19/5607; G01C 19/5719; G01C 19/5614; G01C 19/5621; G01C 19/5628
USPC ........................... 73/504.16, 504.12; 310/370
See application file for complete search history.

(56) References Cited

U.S. PATENT DOCUMENTS 5,939,631 A 8/1999 Moore
7,107,843 B2 * 9/2006 Ohuchi et al. ............. 73/504.16
(Continued)

FOREIGN PATENT DOCUMENTS

EP 1 816 434 8/2007

OTHER PUBLICATIONS

International Search Report Issued Apr. 1, 2011 in PCT/FR10/000854 Filed Dec. 20, 2010.

*Primary Examiner* — Helen Kwok
(74) *Attorney, Agent, or Firm* — Oblon, McClelland, Maier & Neustadt, L.L.P.

(57) ABSTRACT

The Coriolis-effect gyrometer has a tuning fork having two tines, which tuning fork is formed in a plate of piezoelectric crystal and provided with electrodes composed of ribbon conductors supported solely by the faces of the tines parallel to the plate. The drive excitation and drive detection electrodes are connected to an oscillator circuit, and the Coriolis detection electrodes are connected to a detection circuit. For each of the faces parallel to the plate of each of the tines the drive detection ribbon is disposed between the drive excitation ribbon and the Coriolis detection ribbon and is connected to the inverting input of an operational amplifier, the non-inverting input of which is connected to the electric ground, said operational amplifier forming part of the oscillator circuit.

10 Claims, 5 Drawing Sheets

(56) References Cited

U.S. PATENT DOCUMENTS

| | | | |
|---|---|---|---|
| 7,260,990 B2 * | 8/2007 | Ohuchi et al. | 73/504.12 |
| 7,673,529 B2 * | 3/2010 | Uemura | 73/862.59 |
| 7,802,473 B2 * | 9/2010 | Endo et al. | 73/504.16 |
| 7,987,715 B2 * | 8/2011 | Uemura | 73/504.16 |
| 7,997,135 B2 * | 8/2011 | Ashimori | 73/504.16 |
| 8,117,916 B2 * | 2/2012 | Okamoto et al. | 73/504.16 |
| 8,154,178 B2 * | 4/2012 | Ichikawa et al. | 310/344 |
| 2003/0029239 A1 * | 2/2003 | Hatanaka et al. | 73/504.16 |
| 2008/0053190 A1 | 3/2008 | Murakami | |
| 2008/0115580 A1 * | 5/2008 | Murakami et al. | 73/504.16 |
| 2009/0044624 A1 * | 2/2009 | Hayashi et al. | 73/504.16 |

* cited by examiner

ELECTRODES AND ASSOCIATED ELECTRONIC CIRCUITS FOR A PIEZOELECTRIC VIBRATING GYROMETER

BACKGROUND (1) Field

The present invention relates, in general terms, to piezoelectric vibrating gyrometers which make it possible for the rotation of an object in space to be measured.

The invention relates more especially to piezoelectric excitation and detection electrodes for the two useful modes of a tuning fork and to associated electronic circuits, which make it possible to avoid coupling, by an electrostatic effect, between the electrodes dedicated to one of the two useful modes and those dedicated to the other useful mode, while providing good piezoelectric efficiency of those electrodes and admitting of a low cost of manufacture.

(2) Description of the Related Art

The principle of operation of a vibrating gyrometer is based on detection of Coriolis accelerations which act on a vibrating resonator in accordance with a first useful mode referred to as the "drive mode", when this resonator is subjected to an angular rate of rotation $\vec{\Omega}$ referenced relative to an inertial reference frame referred to as the "Galilean reference frame". Accordingly, the Coriolis accelerations are alternating at the frequency of said first useful mode and excite a second useful vibration mode referred to as the "detection mode", the amplitude of the vibration of which is proportional to $\Omega$. Measurement of this amplitude, generally converted into the form of electrical signals, accordingly makes it possible to determine $\Omega$.

It is known that the vibrating element may be a tuning fork having two tines attached to a common part, the drive mode of which is a flexural vibration of the two tines in mutual phase opposition parallel to the plane of the tuning fork and the detection mode of which is a flexural vibration of the two tines in mutual phase opposition perpendicular to the plane of the tuning fork.

Accordingly it is known for the tuning fork to be produced in a plane plate of quartz, the faces of which are parallel to the crystallographic plane XY, the tines of the tuning fork being oriented parallel to the Y axis, and for means for maintaining the drive mode in vibration and detecting the detection mode to be electrodes in the form of ribbon conductors disposed longitudinally on the two tines and acting by a piezoelectric effect.

More generally, it is known to the person skilled in the art that other piezoelectric crystals and other orientations of the plate in the crystallographic reference frame are possible, the important aspect being to obtain sufficient piezoelectric coupling between extension or compression of the longitudinal fibres of the flexurally vibrating tines and the electric field or displacement of the charges in directions perpendicular to the longitudinal axes of the tines.

The electrodes for maintaining the drive mode in vibration are connected to an electronic oscillator circuit which makes it possible to maintain the drive mode in resonance vibration and comprise at least one excitation electrode of the drive mode on which there is present an alternating excitation potential and at least one detection electrode of the drive mode, in order to make possible the electromechanical oscillation of the drive mode. The value of working in resonance vibration lies in reconciling a large amplitude of vibration of the drive mode, and therefore good sensitivity of the gyrometer, with low electrical consumption of the device. In order to facilitate the description, said electrodes for maintaining the drive mode in vibration will be referred to, in their respective cases, as the drive excitation electrode and drive detection electrode. The electrodes for detecting the detection mode are connected to an electronic detection circuit which makes it possible to produce an electric voltage representative of the rotation rate to be measured. Unlike the drive mode, the detection mode generally works in forced vibration and therefore requires only one detection electrode, referred to as the Coriolis detection electrode.

It is also known for drive excitation, drive detection and Coriolis detection electrodes to cohabit side-by-side along each of the two tines, especially in the vicinity of the end attached to the common part, because that is where the mechanical stresses of the flexural vibrations are maximal, that is to say where the piezoelectric effect is maximal. This makes it possible to obtain good piezoelectric efficiency for the totality of the electrodes and therefore relatively low drive excitation electric consumption and relatively high Coriolis detection sensitivity.

The side-by-side disposition of the drive excitation, drive detection and Coriolis detection electrodes makes it necessary to take certain precautionary measures in order to avoid the alternating electric potentials for excitation of the drive mode giving rise, by the electrostatic effect, to the appearance of undesirable electrical signals on the Coriolis detection electrodes, it being possible that such signals might be falsely interpreted as being caused by rotation at a rate $\Omega$ applied to the device. It is accordingly known (U.S. Pat. No. 5,939,631) to employ two means which are cumulative in their efficiencies.

The first known means consists of applying two alternating electric potentials in phase opposition to two drive excitation electrodes respectively, which may be obtained by means of an arrangement of the oscillator circuit, and having the totality of the electrodes disposed in such a way that, as a result of symmetry, the Coriolis detection electrodes each receive, by the electrostatic effect, the same amount of positive undesirable signals as negative undesirable signals, that is to say they each receive an undesirable signal which overall is zero. In practice, in view of usual production imperfections, this first known means makes it possible to reduce the amplitude of the undesirable signals by one to two orders of magnitude.

The second known means consists of interposing between the drive excitation electrodes and the Coriolis detection electrodes a ground screen in the form of additional ribbon conductors disposed on the two tines of the tuning fork and connected to the electric ground of the device. These additional ribbon conductors have the same general appearance as electrodes and because of that they cannot form a total screen between the drive excitation electrodes and the Coriolis detection electrodes but they nevertheless make it possible to reduce the amplitude of the undesirable signals by a further one to two orders of magnitude, that reduction being added to that obtained by the first known means.

It must be emphasised that the simultaneous implementation of those two known means, which makes it possible in practice to reduce the amplitude of the undesirable signals by three to four orders of magnitude, is very useful in view of the very low values of the signal produced by the Coriolis accelerations. Accordingly, by way of example, an angular rate of rotation of 1 degree/second can generate, by the piezoelectric effect, at the Coriolis detection electrodes, electric charges of the order of $10^{-16}$ Coulomb, whereas the undesirable charges generated by the electrostatic effect can be of the order of $10^{-12}$ Coulomb before implementation of the two known means. Under those conditions, the two known means make it possible to reduce the undesirable charges to values of the order of $10^{-16}$ to $10^{-15}$ Coulomb, which is sufficiently low for signal processing operations to make it possible to obtain a gyrometer measurement precision of the order of 0.01 degree/second.

In the case of the known arrangement described in the above-mentioned patent specification, the addition of additional ribbon conductors connected to the electric ground of the device has few drawbacks, because the electrodes are disposed on the four longitudinal faces of each of the tines and because of that there is sufficient space for the presence of the additional ribbons not to encroach significantly upon the space available for the electrodes and therefore practically not to adversely affect the piezoelectric efficiency of the electrodes. It will be noted that the tuning fork of the known arrangement is obtained by chemical forming of a quartz plate, that the electrodes and additional ribbons can be obtained by means of photolithographic processes used in the low-cost manufacture of clock resonators, but that producing the electrodes disposed on the formed sides of the tines requires substantially more onerous means such as evaporation of metal through a mechanical mask disposed on the formed tuning fork.

In the case of low-cost manufacture, that is to say where it is necessary to rule out placing electrodes on the formed sides of the tines and therefore to make do with the faces parallel to the plane of the plate, the addition of the additional ribbons connected to the electric ground of the device can be accomplished only at the expense of the space available for the electrodes and therefore of the piezoelectric efficiency of the electrodes.

Accordingly, the teaching of the prior art does not make it possible, in the case of low-cost production, to benefit simultaneously from a substantial reduction in the undesirable signal and from satisfactory piezoelectric efficiency of the electrodes.

BRIEF SUMMARY

The present invention is directed to overcoming that drawback of the prior art by providing electrodes disposed solely on the faces parallel to the plane of the plate and an arrangement of electronic circuits associated with said electrodes which make it possible, without having recourse to additional ribbon conductors connected to the electric ground of the device, to obtain a substantial reduction in the undesirable signals electrostatically generated on the Coriolis detection electrodes by the alternating excitation electric potentials. Accordingly, the piezoelectric efficiency of the electrodes can be satisfactory because there is sufficient space available for the electrodes, and the electrodes can be produced at low cost because there are no electrodes on the formed sides of the tines of the tuning fork.

To that end, the Coriolis-effect gyrometer, comprising a tuning fork formed in a plane plate of piezoelectric crystal and vibrating in accordance with a drive mode and a detection mode, the two tines of the tuning fork supporting drive excitation electrodes and drive detection electrodes, which are connected to an electronic oscillator circuit making it possible to maintain the drive mode in resonance vibration, and Coriolis detection electrodes, which are connected to an electronic detection circuit of the detection mode, the electrodes being composed of ribbon conductors supported solely on the faces of the plate and disposed parallel to the longitudinal axes of the tines, each of the faces parallel to the plane of the plate of each of the tines supporting a drive excitation ribbon and a drive detection ribbon and a Coriolis detection ribbon, is characterised in that, for each of the faces parallel to the plane of the plate of each of the tines, the drive detection ribbon is disposed between the drive excitation ribbon and the Coriolis detection ribbon and is connected to the inverting input of an operational amplifier, the non-inverting input of which is connected to the electric ground of the device, said operational amplifier constituting the active electronic component of a charge or current amplifier forming part of the electronic oscillator circuit and serving for detection of the amplitude of vibration of the drive mode.

Accordingly, the role of an operational amplifier being to maintain at a value of almost zero the difference in electric potential between its inverting and non-inverting inputs, each drive detection ribbon is almost at the electric ground of the device and accordingly can, in addition to its contribution to the operation of the oscillator circuit of the drive mode, act as a ground screen protecting—for the tine supporting it—the coplanar Coriolis detection ribbon from the influence of the alternating electric potential present on the coplanar drive excitation ribbon.

BRIEF DESCRIPTION OF THE DRAWINGS

The characteristics and advantages of the invention will become more clearly apparent on reading the detailed description and Figures relating thereto, in which.

DETAILED DESCRIPTION

Figure 1:
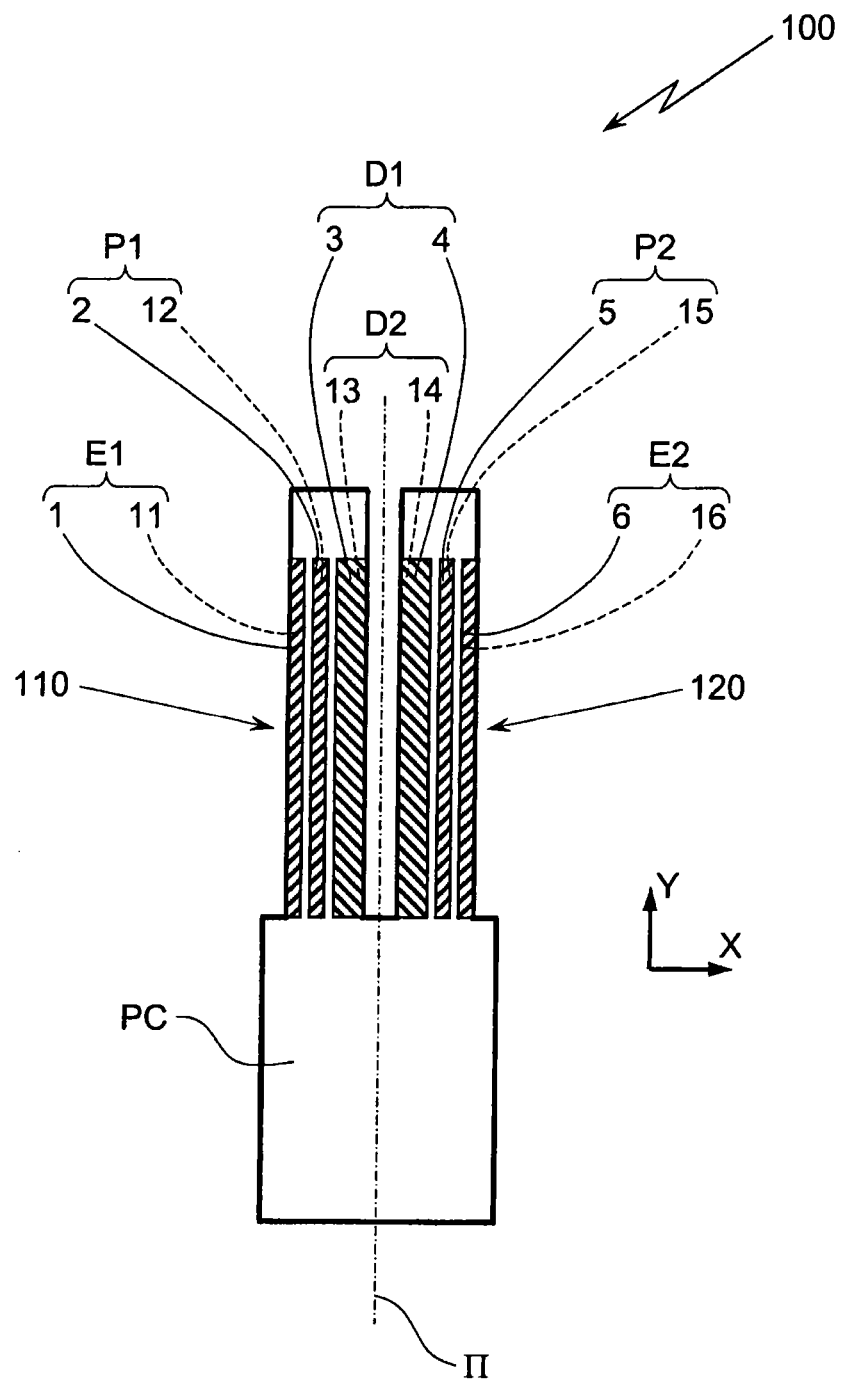
FIG. 1 is a front view showing a quartz tuning fork provided with electrodes in accordance with the invention.

FIG. 1 shows a tuning fork 100 having two tines 110 and 120 attached to a common part PC, formed in a plane plate of quartz parallel to the crystallographic plane XY, the two tines 110 and 120 being parallel to the Y axis. Other piezoelectric crystals may be suitable for the gyrometer according to the invention, for example gallium orthophosphate or langasite, as well as other orientations of the plate, as is the case for example with a quartz plate rotated through an angle θ about the X axis. It must therefore be understood that the scope of the invention is not limited to quartz and the crystallographic orientations shown in FIG. 1 but extends more generally to piezoelectric crystals and crystallographic orientations which make it possible to obtain sufficient piezoelectric coupling between the extension or compression of the flexurally vibrating longitudinal fibres of the tines and the electric field or displacement of charges in directions perpendicular to the longitudinal axes of the tines.

The tuning fork 100 is provided with electrodes in accordance with the invention, which are composed of ribbon conductors disposed longitudinally solely on those faces of the two tines of the tuning fork which are parallel to the plane of the plate. Said ribbon conductors can be produced, for example, by means of photolithographic processes used in the low-cost manufacture of clock resonators. FIG. 1 shows the arrangement of ribbons 1, 2, 3, 4, 5, 6 on one of the faces of the plate, the ribbons 11, 12, 13, 14, 15, 16 on the other face being disposed respectively opposite them. In order to facilitate understanding of the drawing, the ribbons identified with the aid of a broken labelling line are disposed on the other face. The dimensions of each of the ribbons are substantially the same as those of the ribbon disposed opposite on the other face. Furthermore, the tuning fork 100 so provided with ribbons is substantially symmetrical relative to a plane n perpendicular to the plane of the plate and parallel to the longitudinal axes of the tines.

Still referring to FIG. 1, each of the faces parallel to the plane of the plate of each of the two tines supports a drive excitation ribbon (1; 11; 6; 16), a drive detection ribbon (2; 12; 5; 15) and a Coriolis detection ribbon (3; 13; 4; 14), and the drive detection ribbon is disposed between the drive excitation ribbon and the Coriolis detection ribbon. It will be noted that the four ribbons of the Coriolis detection electrodes border the gap separating the two tines of the tuning fork.

Still referring to FIG. 1, external electrical connections (not shown) connect the ribbons 1 and 11 in order to form the drive excitation electrode E1, the ribbons 6 and 16 to form the drive excitation electrode E2, the ribbons 2 and 12 to form the drive detection electrode P1, and the ribbons 5 and 15 to form the drive detection electrode P2. It will be noted that said external electrical connections, the production of which will be explained with reference to FIG. 4 for a monolithic gyrometer structure, connect, for each of the drive excitation and drive detection electrodes, a ribbon and the ribbon disposed opposite on the other face of the plate. Other electrical connections (not shown) connect the coplanar ribbons 3 and 4 to form the Coriolis detection electrode D1, and the coplanar ribbons 13 and 14 to form the Coriolis detection electrode D2. For the disposition of ribbons shown in FIG. 1, those other electrical connections can be constituted by connection ribbon conductors supported by the faces of the common part PC parallel to the plane of the plate as will be shown in FIG. 4.

Figure 2:
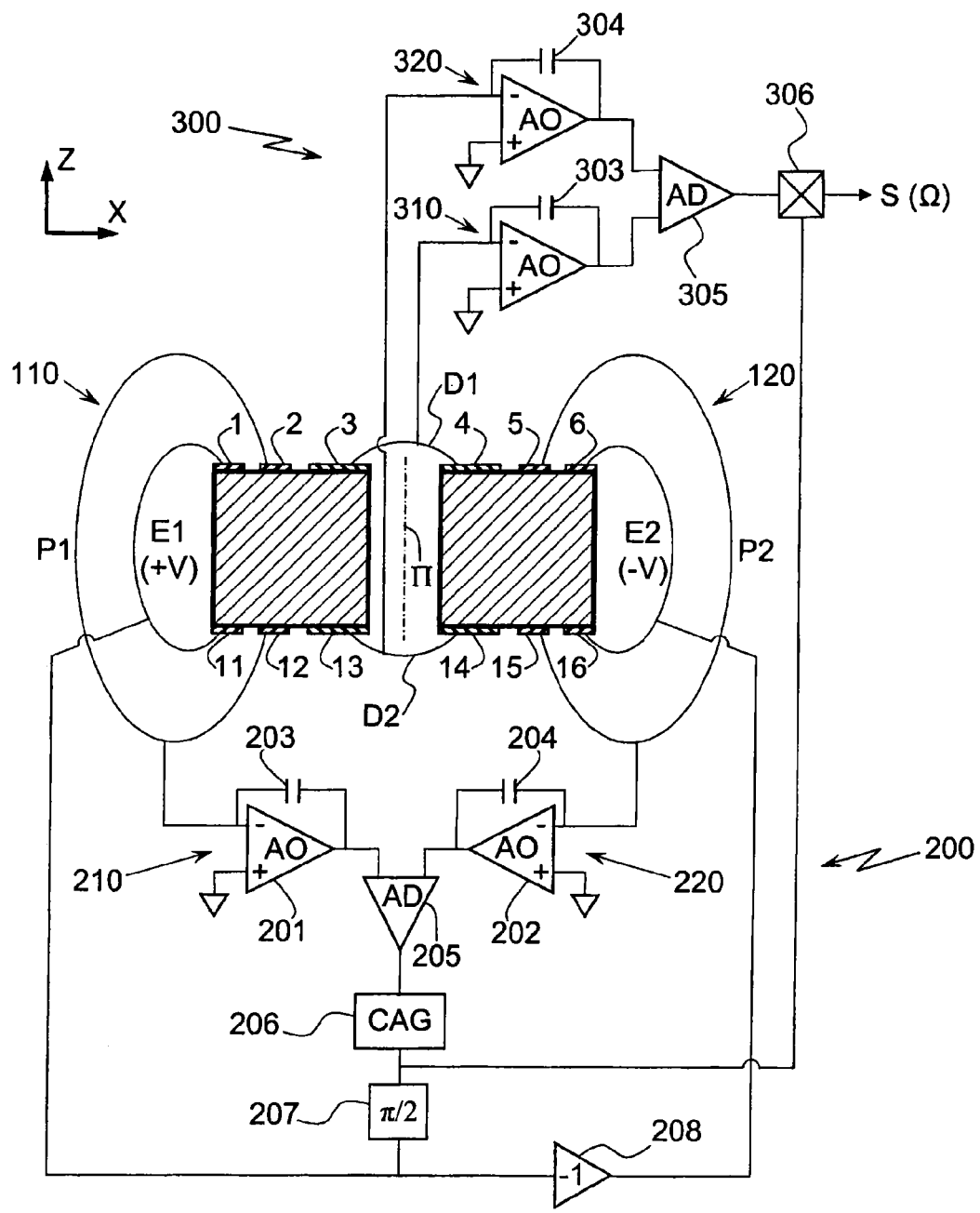
FIG. 2 shows a cross-sectional view through the two tines of the tuning fork and electrodes of FIG. 1, and a diagram of the electronic circuits according to the invention which are associated with said electrodes.

FIG. 2 shows a cross-section through the two tines 110 and 120 and electrodes according to the invention shown in FIG. 1, and also a diagram of electronic circuits according to the invention which are associated with said electrodes. The electronic circuits comprise an oscillator circuit 200 which makes it possible to maintain the drive mode in resonance vibration, and a detection circuit 300 of the detection mode which makes it possible to form an electric voltage representative of the rotation rate to be measured.

The oscillator circuit 200 comprises two charge amplifiers 210 and 220, a differential amplifier 205, an automatic gain control circuit 206, a phase-shifting circuit 207 and an inverting circuit 208. For each of the tines (110; 120) of the tuning fork, the drive detection electrode (P1; P2) is connected to the inverting input of an operational amplifier (201; 202), the non-inverting input of which is connected to the electric ground of the device, said operational amplifier constituting the active electronic component of the charge amplifier (210; 220) obtained by adding a capacitor (203; 204) between said inverting input and the output of the operational amplifier. Accordingly, the output voltage of the operational amplifier (201; 202) is proportional to the charges generated by the vibration of the drive mode, and its amplitude is therefore proportional to the amplitude of vibration of the drive mode. In view of the disposition of the drive excitation and drive detection electrodes on the two tines and flexural vibrations of the two tines in mutual phase opposition parallel to the plane of the plate, the output voltages of the two operational amplifiers 201 and 202 are in mutual phase opposition and accordingly add their amplitudes through the differential amplifier 205, whose output signal, after amplitude control by means of the automatic gain control circuit 206 and after phase-shifting by $\pi/2$ by means of the phase-shifting circuit 207, is applied, on the one hand, to the electrode E1 and, on the other hand, after inverting by means of the inverting circuit 208, to the electrode E2. Accordingly, the oscillator circuit 200 can be seen as an electronic double-loop oscillator making it possible to maintain the resonance vibration of the drive mode by applying to the drive excitation electrodes E1 and E2 alternating excitation electrical potentials +V and −V, respectively, in mutual phase opposition, in coherence with the flexural vibrations of the two tines in mutual phase opposition parallel to the plane of the plate. The oscillator circuit 200 of the gyrometer according to the invention can also function with current amplifiers replacing the charge amplifiers 210 and 220, provided that the phase-shifting circuit 207 is omitted in order to meet the phase condition necessary for obtaining the electromechanical oscillation. In principle, the conversion of the charge amplifier (210; 220) into a current amplifier is obtained by replacing the capacitor (203; 204) with a resistance. However, for the gyrometer according to the invention, the charge amplifier is generally preferable to the current amplifier, which causes an additional signal noise due to the resistance.

The detection circuit 300 of the detection mode comprises two charge amplifiers 310 and 320 similar to those (210 and 220) employed in the oscillator circuit 200, a differential amplifier 305 similar to the differential amplifier 205 and a synchronous demodulation circuit 306. Each of the Coriolis detection electrodes (D1; D2) is connected to the input of a charge amplifier (310; 320), the output voltage of which is proportional to the charges generated by the alternating Coriolis accelerations. The amplitude of said output voltage is accordingly proportional to the rotation rate Ω to be measured. In view of the disposition of the Coriolis detection electrodes on the two tines and flexural vibrations of the two tines in mutual phase opposition perpendicular to the plane of the plate, the output voltages of the two charge amplifiers 310 and 320 are in mutual phase opposition and accordingly add their amplitudes through the differential amplifier 305, the output signal of which is demodulated synchronously by a signal coming from the oscillator circuit 200 in order to form the DC voltage S(Ω) representative of the rotation rate to be measured.

Still referring to FIG. 2, it will be noted that the symmetrical disposition of the ribbons with respect to the plane Π and the two alternating potentials +V and −V in phase opposition on the drive excitation electrodes E1 and E2, respectively, make it possible for each of the Coriolis detection electrodes D1 and D2 to receive, by the electrostatic effect, substantially the same amount of positive charges as negative charges, that is to say an overall amount of charges which is substantially zero. Accordingly, by means of this aspect which is in common with the first known means explained in the introduction, a first quality of the gyrometer according to the invention is that of making it possible to reduce, by one to two orders of magnitude, undesirable electric charges due to excitation potentials.

A second quality belonging to the gyrometer according to the invention relates to an additional reduction of said undesirable charges which is obtained by the disposition, on each of the faces parallel to the plane of the plate of each of the tines, of the drive detection ribbon between the drive excitation ribbon and the Coriolis detection ribbon, said drive detection ribbon being connected to the inverting input of an operational amplifier, the non-inverting input of which is connected to the electric ground of the device. Accordingly, the role of an operational amplifier being to maintain at a value of almost zero the difference in electric potential between its inverting and non-inverting inputs, each drive detection ribbon is almost at the electric ground of the device and accordingly can, in addition to its contribution to the operation of the oscillator circuit of the drive mode, act as a ground screen protecting for the tine supporting it the coplanar Coriolis detection ribbon from the influence of the alternating electric potential present on the coplanar drive excitation ribbon. By way of illustration, for the gyrometer according to the invention the difference in potential between the inverting and non-inverting inputs of each of the operational amplifiers (201; 202) of the oscillator circuit 200 can be less than $10^{-6}$ volt. Accordingly, it is possible to reduce the undesirable electric charges due to the alternating excitation potentials by a further one to two orders of magnitude, that reduction being added to that explained hereinbefore obtained by symmetrical disposition of the ribbons relative to the plane Π and the two alternating excitation potentials in phase opposition on the respective drive excitation electrodes E1 and E2.

Accordingly, it is not useful, unlike in the known gyrometer explained in the introduction, to add additional ribbons connected to the electric ground of the device. This makes it possible for solely those faces of the tines which are parallel to the plane of the plate to offer sufficient space for disposing thereon electrodes whose piezoelectric efficiency is satisfactory.

Accordingly, it is possible to produce an effective gyrometer at low cost.

The reader might be concerned in wondering whether the role of ground screen played by the drive detection electrodes P1 and P2 is as effective as that of ribbon conductors directly connected to the electric ground of the device, especially having regard to the noise of the electric signals present on the Coriolis detection electrodes D1 and D2. For the gyrometer according to the invention, there is no significant difference in efficiency between the two if it is ensured that the capacitance of each of the capacitors (303; 304) of the detection circuit 300 of the detection mode is markedly greater, for example times greater, than the capacitance of each of the capacitors of which one armament is formed by a Coriolis detection ribbon (3; 4; 13; 14) and the other armament is formed by the drive detection ribbon (2; 5; 12; 15) disposed beside it.

Figure 3:
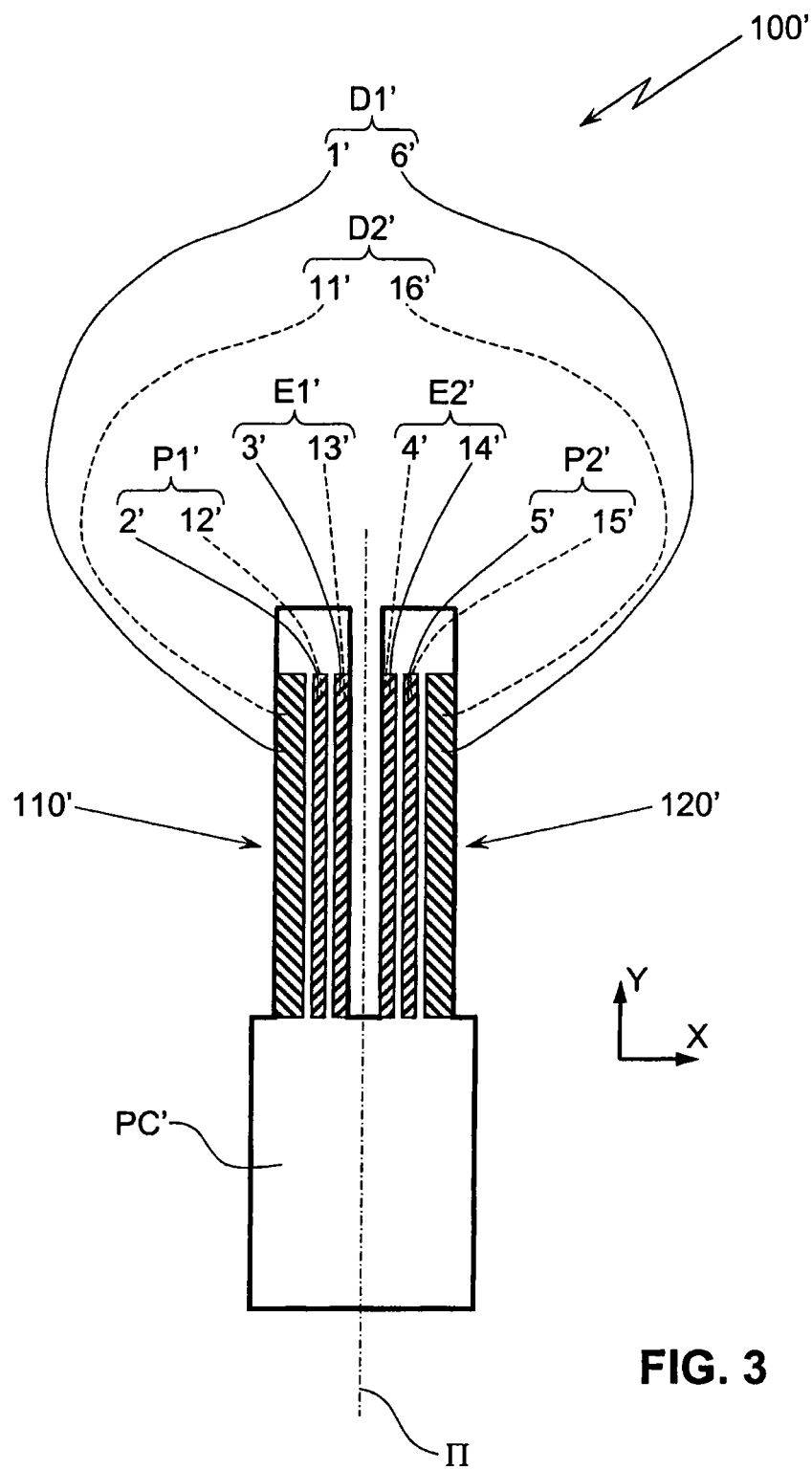
FIG. 3 is a front view showing a quartz tuning fork provided with other electrodes in accordance with the invention.

FIG. 3 shows a tuning fork 100' provided with other electrodes in accordance with the invention. Compared to the tuning fork 100 shown in FIG. 1, the difference lies in the disposition of the drive excitation ribbons 3', 13', 4', 14', and Coriolis detection ribbons 1', 11', 6', 16'. More specifically, the Coriolis detection ribbons do not border the gap separating the two tines of the tuning fork but border the opposite formed sides of the tines. Otherwise, the other characteristics of the electrodes of the tuning fork 100' are the same as those of the tuning fork 100, that is to say especially that each of the faces parallel to the plane of the plate of each of the two tines supports a drive excitation ribbon (3'; 13'; 4'; 14'), a drive detection ribbon (2'; 12'; 5'; 15') and a Coriolis detection ribbon (1'; 11'; 6'; 16'), and the drive detection ribbon is disposed between the drive excitation ribbon and the Coriolis detection ribbon.

Like the tuning fork 100, the tuning fork 100' accordingly provided with ribbons is substantially symmetrical with respect to a plane Π perpendicular to the plane of the plate and parallel to the longitudinal axes of the tines, and external electrical connections (not shown) connect each drive excitation and drive detection ribbon to the respective drive excitation and drive detection ribbon disposed opposite on the other face of the plate for forming, respectively, a drive excitation and drive detection electrode (E1'; E2'; P1'; P2').

As regards the detection electrodes D1' and D2' each formed, as in the case of the tuning fork 100, by connecting two coplanar Coriolis detection ribbons, it is not possible, in the case of the tuning fork 100', to make these connections by means of connection ribbon conductors supported by the faces of the common part PC without interfering with the external electrical connections corresponding to the drive excitation and drive detection electrodes. For the detection electrodes D1' and D2' of the tuning fork 100', it is therefore necessary to have recourse to external electrical connections.

In relation to operation of the electrodes, the electrodes E1', E2', P1', P2', D1', D2' of the tuning fork 100' play parts that are similar to those of the respective electrodes E1, E2, P1, P2, D1, D2 of the tuning fork 100.

Accordingly, as explained for the tuning fork 100 with reference to FIGS. 1 and 2, the drive detection electrode (P1'; P2') of each of the tines of the tuning fork 100' is connected to the inverting input of an operational amplifier, the non-inverting input of which is connected to the electric ground of the device, said operational amplifier constituting the active electronic component of a charge or current amplifier forming part of an electronic oscillator circuit and serving for detection of the amplitude of vibration of the drive mode.

Like for the tuning fork 100, the drive excitation electrodes E1' and E2' of the tuning fork 100' are connected to that oscillator circuit, which makes it possible to maintain, by applying to said excitation electrodes alternating potentials in mutual phase opposition, the drive mode in resonance vibration in flexion of the two tines in mutual phase opposition parallel to the plane of the plate, and the Coriolis detection electrodes are connected to a detection circuit of the detection mode, which makes it possible to form an electric voltage proportional to the amplitude of the detection mode for which the two tines vibrate in mutual phase opposition perpendicular to the plane of the plate, that is to say an electric voltage proportional to the rotation rate Ω to be measured.

The reader will have understood that, like for the tuning fork 100, the electrodes of the tuning fork 100' and the arrangement of the associated electronic circuits similar to the circuits shown in FIG. 2 make it possible to produce an effective gyrometer at low cost.

Figure 4:
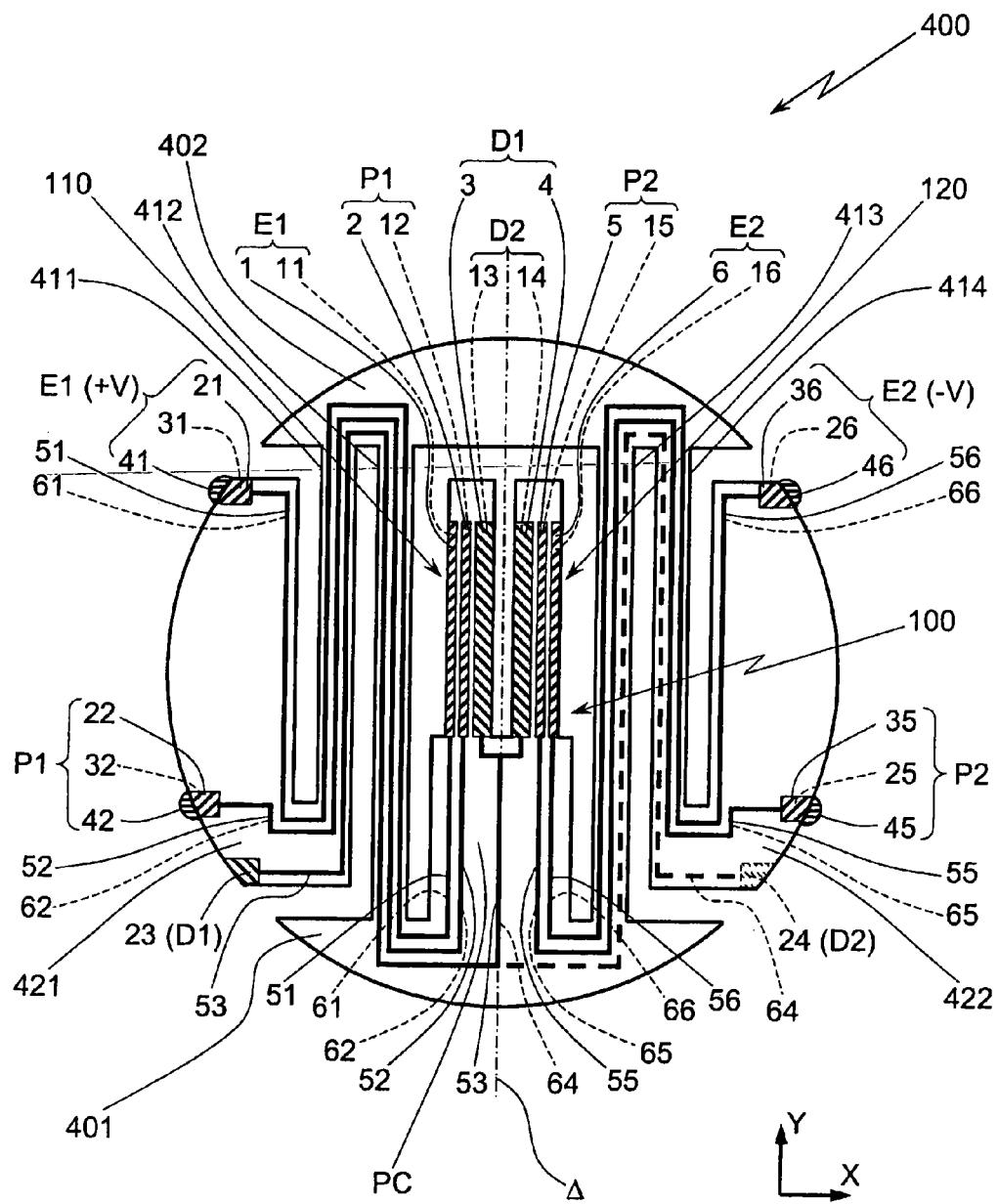
FIG. 4 is a front view of a monolithic gyrometer structure comprising a tuning fork which is the same as that shown in FIG. 1, which view is intended to show the ribbon conductors for electrical connection of the electrodes and contact tabs for connecting the electronic circuits.

FIG. 4 shows a monolithic gyrometer structure 400, formed in a plane plate of quartz, and comprising in its central portion a tuning fork which is the same as that (100) shown in FIG. 1, for which in FIG. 4 the references for the electrodes according to the invention and for the ribbons forming them will be maintained. The monolithic structure 400 also comprises two high-mass movable parts 401, 402, four flexible arms 411, 412, 413, 414, and two fixed parts 421 and 422. The monolithic structure 400 is substantially symmetrical relative to a medial axis Δ parallel to the longitudinal axes of the tines of the tuning fork. It will be noted that the medial axis Δ is contained in the plane Π of symmetry shown in FIGS. 1, 2 and 3. The particular arrangement of said high-mass movable parts and said flexible arms makes it possible to obtain excellent mechanical filtering of the vibrations of the useful modes of the tuning fork 100 relative to the fixed parts 421 and 422. This particular arrangement is the subject-matter of the patent specification FR 2 789 171 in the name of the Applicant.

The ribbon conductors for electrical connection of the electrodes and the contact tabs for connecting the electronic circuits (not shown) will now be explained. In order to facilitate understanding of the description, the face that is visible in FIG. 4 will be called the front face, and the face located opposite the rear face.

Contact tabs 21, 22, 23 of substantially trapezoidal shape are disposed on the front face of the fixed part 421, and contact tabs 31, 32 are disposed on the rear face opposite the tabs 21, 22, respectively. Contact tabs 24, 25, 26 are disposed on the rear face of the fixed part 422, and contact tabs 35, 36 are disposed on the front face opposite tabs 25, 26, respectively. It will be noted that the disposition of the contact tabs maintains the symmetry of the monolithic structure 400 relative to the medial axis Δ. In other words, from the geometric point of view, the contact tabs located on one of the faces (front, rear) of one of the fixed parts (421, 422) will be found again, after rotation through 180° about the axis Δ, on the other face of the other fixed part.

External conductor connections 41, 42, 45, 46 disposed on the formed sides of the fixed parts make it possible to connect the contact tabs 21, 22, 35, 36 disposed on the front face to the contact tabs 31, 32, 25, 26, respectively, disposed on the rear face. Said external conductor connections are, for example, produced by means of a conductive adhesive, which has the advantage of simple and economical implementation. It will be noted that the presence of conductive adhesive on the fixed parts 421 and 422 is not disadvantageous to operation of the gyrometer. This would not be the case if the conductive adhesive were disposed on any other part of the monolithic gyrometer structure 400, because this would result in damping of the vibrations of the useful modes and therefore in a reduction in the performance of the gyrometer.

Still referring to FIG. 4, the contact tabs are connected to the ribbon conductors forming the electrodes of the tuning fork 100 by means of connecting ribbon conductors disposed on the common part PC of the tuning fork 100, the movable high-mass parts 401, 402, the flexible arms 411, 412, 413, 414 and the fixed parts 421 and 422. The disposition of said connecting ribbon conductors being symmetrical relative to the medial axis Δ, their detailed description will be limited to the front face of the monolithic gyrometer structure. Ribbons 1 and 2 of the tine 110 are connected to the contact tabs 21 and 22, respectively, by means of connecting ribbons 51 and 52, respectively. Symmetrically relative to the plane Π perpendicular to the plane of the plate and containing the axis Δ, ribbons 6 and 5 of the tine 120 are connected to the contact tabs 36 and 35, respectively, by means of connecting ribbons 56 and 55, respectively. Ribbons 3 and 4 are connected to one another and to the contact tab 23 by means of the connecting ribbon 53. On the rear face, as indicated in the Figure, the connecting ribbons 61, 62, 66, 65 are opposite the connecting ribbons 51, 52, 56, 55, respectively, and ribbons 13 and 14 are connected to one another and to the contact tab 24 by means of the connecting ribbon 64. Accordingly, by virtue of the disposition of the connecting ribbons and of the contact tabs on the front and rear faces of the monolithic structure 400, and the external conductor connections disposed on the formed sides of the fixed parts 421 and 422, it is possible to make the connections mentioned hereinbefore in relation to FIG. 1 between the ribbons constituting the electrodes according to the invention. Furthermore, each of said electrodes (E1; E2; P1; P2; D1; D2) is connected to at least one contact tab (21; 31; 26, 36; 22, 32; 25, 35; 23; 24) which is readily accessible for connection of the electronic circuits.

It will be noted that the symmetry, relative to the medial axis Δ, of the ribbons constituting the electrodes, of the connecting ribbons and of the contact tabs makes it possible to produce them on the front and rear faces of the plate using the same photolithographic mask, because it is sufficient to turn over the plate by rotating it through 180° about the axis Δ between the photolithographic operation carried out on the front face and that carried out on the rear face.

It will also be noted that the disposition of the connecting ribbons maintains the characteristic of the electrodes according to the invention, because the connecting ribbons 53, 64 of the Coriolis detection electrodes D1, D2, respectively, are protected from the influence of the alternating potentials present on the connecting ribbons of the drive excitation electrodes E1 and E2 by virtue of the part of ground screen played by the connecting ribbons of the drive detection electrodes P1 and P2.

However, as a function of the dimensions of the monolithic structure 400 and the vibration frequency of the drive mode, it is possible that the relatively long length of the connecting ribbons of the drive excitation and drive detection electrodes has a disadvantage with respect to operation of the electronic oscillating loops of the oscillator circuit 200 shown in FIG. 2. This disadvantage, known more generally in the field of quartz oscillators under the term "influence of inter-electrode capacitance", is explained hereinbelow for electrodes E1 and P1, the explanation being similar for electrodes E2 and P2.

Still referring to FIG. 4, when the drive mode is maintained in resonance vibration, the ribbon conductors 2, 12, 52, 62 corresponding to the electrode P1 receive electric charges from two different sources. The first source, referred to as useful, is the vibration of the drive mode which generates charges by the piezoelectric effect, said charges making it possible to detect the mechanical vibration amplitude of the drive mode and being in phase with said mechanical vibration. The second source, referred to as parasitic, is the alternating excitation potential +V applied to the ribbons 1, 11, 51, 61 corresponding to the electrode E1, said alternating potential generating, by the electrostatic effect, charges on the ribbons corresponding to the electrode P1. These charges, referred to as parasitic charges, are in phase with the alternating excitation potential +V and therefore in phase quadrature with the mechanical vibration because it is a resonance vibration. Accordingly, the useful charges and the parasitic charges are in phase quadrature relative to one another, and the overall charges generated on the ribbons corresponding to the electrode P1 are not in phase relative to the useful charges, which risks being prejudicial to the good operation of the gyrometer. C will be used to designate the capacitance of the capacitor of which one armament is formed by the ribbons 1, 11, 51, 61 corresponding to the electrode E1 and the other armament is formed by the ribbons 2, 12, 52, 62 corresponding to the electrode P1. The value of the parasitic charges is therefore $Q_{PARASITIC}=(+V)\times C$. Hereinbelow, a means of overcoming that disadvantage, referring to FIG. 5, is explained.

Figure 5:
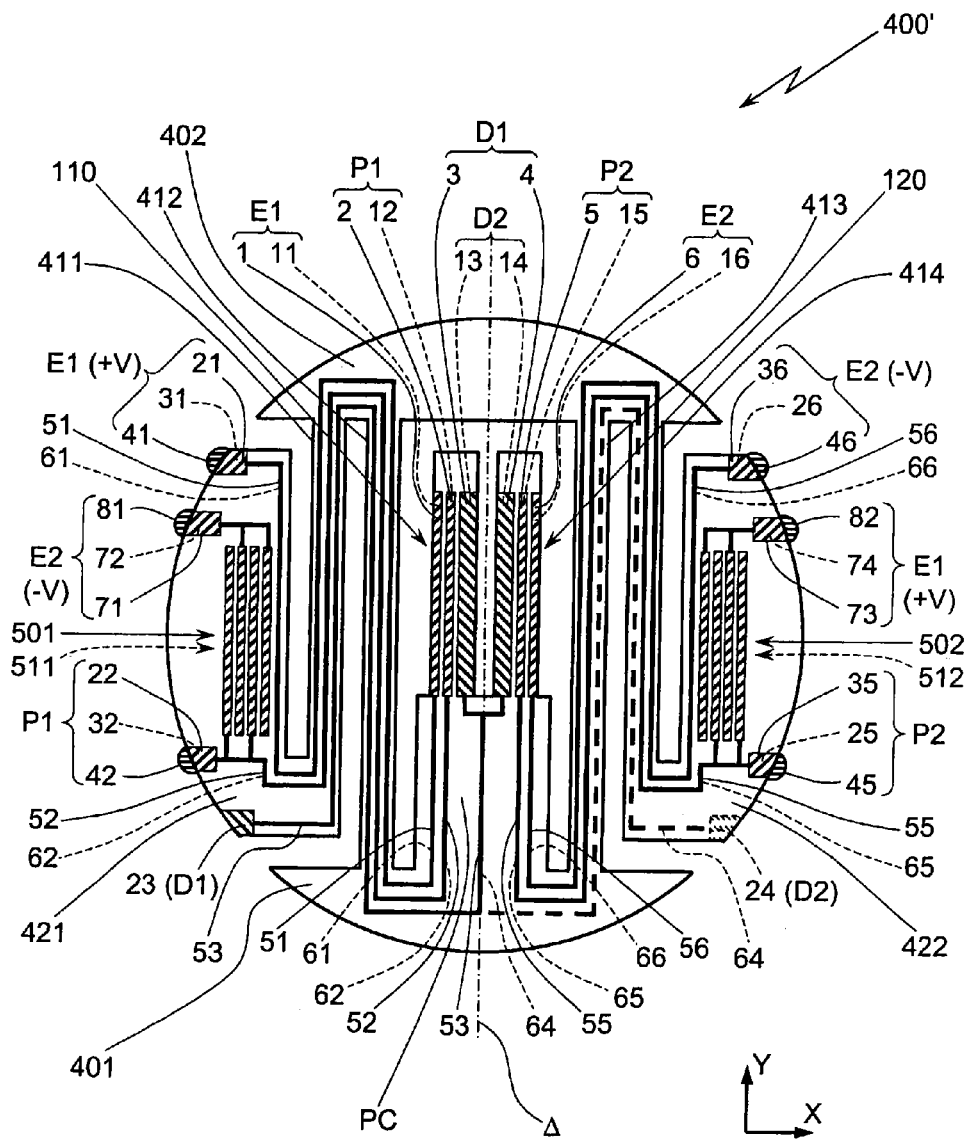
FIG. 5 is a front view of the monolithic gyrometer structure of FIG. 4 to which there have been added interdigitated combs in order to improve operation of the oscillator circuit of the drive mode.

FIG. 5 shows a monolithic gyrometer structure 400' obtained starting from the monolithic structure 400 shown in FIG. 4 by adding interdigitated combs 501, 511, 502, 512 to the two faces (front, rear) of the respective fixed parts 421 and 422.

On the front face of the fixed part 421, the interdigitated comb 501 has teeth connected to the connecting ribbon 52 corresponding to the electrode P1 and meshing with other teeth connected to a contact tab 71. The comb 501 is disposed between the connecting ribbon 52 corresponding to the electrode P1 and the connecting ribbon 51 corresponding to the electrode E1. Electrical connections (not shown) connect the contact tab 71 to the electrode E2, the alternating excitation potential of which is −V. On the rear face, the interdigitated comb 511 is disposed opposite the comb 501, in relation to a contact tab 72 connected to the contact tab 71 by means of an external conductor connection 81 disposed on the formed side of the fixed part 421. Accordingly, the interdigitated combs 501 and 511 form a capacitor of capacitance C' between the electrodes E2 and P1. Under those conditions, the alternating excitation potentials +V and −V applied to the electrodes E1 and E2, respectively, give rise, by the electrostatic effect, to the appearance of an amount of charges $Q=Q_{PARASITIC}(-V)\times C'=V\times(C-C')$ on the excitation electrode P1. Accordingly, by adapting the dimensions of the interdigitated combs so that C=C', which can be obtained, for example, by means of software for simulation by finite elements, it is possible to practically compensate the parasitic charges originating from the alternating potential +V of the electrode E1. Accordingly, the charges present on the electrode P1 are practically solely the useful charges, which makes it possible for the gyrometer to operate well.

Analogously, it is possible to practically compensate parasitic charges generated on the electrode P2 by the alternating potential −V of the electrode E2 by means of interdigitated combs 502 and 512 and contact tabs 73 and 74 disposed on the faces of the fixed part 422, as is shown in FIG. 5, and electrical connections (not shown) connecting the contact tab 73 to the electrode E1.

It will be noted that the disposition of the interdigitated combs maintains the characteristic of the electrodes according to the invention, because the connection ribbons 53, 64 of the Coriolis detection electrodes D1, D2, respectively, are protected from the influence of the alternating potentials present on the teeth of the combs connected to the drive excitation electrodes E1 and E2 by virtue of the part of ground screen played by the connection ribbons of the drive detection electrodes P1 and P2.

Furthermore, the symmetry, relative to the medial axis Δ, of the totality of the interdigitated combs, of the ribbons forming the electrodes, of the connection ribbons and of the contact tabs makes it possible to produce the front and rear faces of the plate by means of the same photolithographic mask.

The invention claimed is:

1. A Coriolis-effect gyrometer comprising:
a tuning fork formed in a plane plate of piezoelectric crystal and vibrating in accordance with a drive mode and a detection mode, two tines of the tuning fork supporting drive excitation electrodes and drive detection electrodes, which are connected to an electronic oscillator circuit making it possible to maintain the drive mode in resonance vibration, and Coriolis detection electrodes, which are connected to an electronic detection circuit of the detection mode, the drive excitation electrodes, drive detection electrodes, and Coriolis detection electrodes being composed of ribbon conductors supported solely on faces of the plate and disposed parallel to longitudinal axes of the tines, each of the faces parallel to the plane of the plate of each of the tines supporting a drive excitation ribbon and a drive detection ribbon and a Coriolis detection ribbon, in which, for each of the faces parallel to the plane of the plate of each of the tines, the drive detection ribbon is disposed between the drive excitation ribbon and the Coriolis detection ribbon and is connected to an inverting input of an operational amplifier, a non-inverting input of which is connected to an electric ground, said operational amplifier constituting an active electronic component of a charge or current amplifier forming part of the electronic oscillator circuit and serving for detection of an amplitude of vibration of the drive mode.

2. The gyrometer according to claim 1, wherein each drive excitation ribbon, drive detection ribbon and Coriolis detection ribbon supported by one face of the plate is disposed opposite a drive excitation ribbon, drive detection ribbon and Coriolis detection ribbon, respectively, supported by the other face of the plate.

3. The gyrometer according to claim 2, wherein electrical connections connect each drive excitation ribbon to the ribbon disposed opposite on the other face of the plate to form a drive excitation electrode, and each drive detection ribbon to the ribbon disposed opposite on the other face of the plate to form a drive detection electrode, and each Coriolis detection ribbon to the ribbon disposed opposite on the other face of the plate to form a Coriolis detection electrode.

4. The gyrometer according to claim 3, wherein four Coriolis detection ribbons border a gap separating the two tines of the tuning fork.

5. The gyrometer according to claim 3, wherein four Coriolis detection ribbons border the formed sides of the tines opposite the formed sides delimiting a gap separating the two tines of the tuning fork.

6. The gyrometer according to claim 4 or 5, wherein the electronic oscillator circuit comprises an electronic double-loop oscillator which applies to two drive excitation electrodes, respectively, two alternating electric potentials in mutual phase opposition.

7. The gyrometer according to claim 6, wherein the tuning fork and the ribbon conductors are substantially symmetrical relative to a plane perpendicular to the plane of the plate and parallel to the longitudinal axes of the tines.

8. The gyrometer according to claim 7, wherein the tuning fork is an integral part of a plane monolithic structure having two fixed parts and substantially symmetrical relative to a medial axis contained in said plane perpendicular to the plane of the plate and parallel to the longitudinal axes of the tines.

9. The gyrometer according to claim 8, wherein said electrical connections connecting each of the drive excitation and drive detection ribbons to the ribbon disposed opposite on the other face of the plate are made by means of electrical connection ribbon conductors and contact tabs supported by the two faces of the plate, and conductor connections disposed on the formed sides of said fixed parts, said electrical connection ribbon conductors and said contact tabs being symmetrical relative to said medial axis.

10. The gyrometer according to claim 9, wherein interdigitated combs are supported by the faces of said fixed parts parallel to the plane of the plate, each of said interdigitated combs being disposed between two ribbon conductors for electrical connection of a respective ribbon of a drive excitation electrode and ribbon of a drive detection electrode, and having teeth electrically connected to said drive detection electrode and other teeth electrically connected to the other, drive excitation, electrode.

* * * * *